(No Model.)

J. R. SUTLIFF.
DRAWER KNOB.

No. 325,712. Patented Sept. 8, 1885.

WITNESSES
Fred. Harris
Fred. P. Dolan.

INVENTOR
James R. Sutliff
by his attys
Clarke & Raymond

UNITED STATES PATENT OFFICE.

JAMES R. SUTLIFF, OF MERIDEN, ASSIGNOR TO FOSTER, MERRIAM & CO., OF WEST MERIDEN, CONNECTICUT.

DRAWER-KNOB.

SPECIFICATION forming part of Letters Patent No. 325,712, dated September 8, 1885.

Application filed February 19, 1884. (No model.)

*To all whom it may concern:*

Be it known that I, JAMES R. SUTLIFF, of Meriden, in the county of New Haven and State of Connecticut, a citizen of the United States, have invented a new and useful Improvement in Drawer-Knobs, of which the following is a full, clear, and exact description, reference being had to the accompanying drawings, in explaining its nature, in which—

Figure 1:
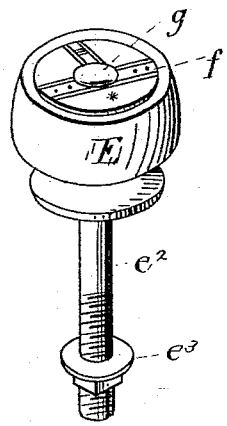
Figure 2:
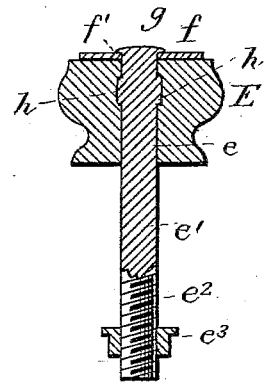

Figure 1 is a perspective view of a knob containing my invention. Fig. 2 is a central longitudinal section thereof; and Fig. 3 shows in section the present form of construction, upon which mine is an improvement.

This invention relates to an improvement in knobs or buttons for drawers, commodes, and other like articles; and it consists in various details of manufacture, whereby the construction is materially cheapened without affecting the appearance or strength of the knob or button.

Figure 3:
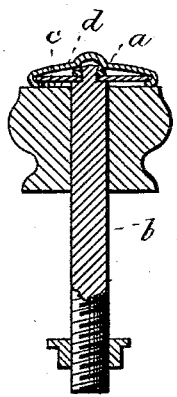

Heretofore it has been customary to make knobs or buttons of this construction as represented in Fig. 3—that is, the outer end of the pin or shank $b$ of the knob was milled, a washer, $c$, riveted upon the same, and a scalp or rosette, $d$, then fastened upon the end of the rivet by spinning or turning over its flange thereon. By my invention I am enabled to secure substantially the same form and finish of the knob or button, and at the same time save the expense of milling the pin, the washer itself, the expense of riveting it on and of spinning or fastening on the scalp or rosette to the washer. This I accomplish substantially as follows: The knob or button E (see Figs. 1 and 2) is provided with a hole, $e$, through which the stem or spindle $e'$ extends. It has upon its inner end the screw-thread $e^2$, adapted to receive a fastening-nut, $e^3$. Upon the outer end of the knob I place the rosette or ornamental disk $f$, through which I form a hole, $f'$, which corresponds with the hole in the knob or button, and the disk is placed upon the end of the knob or button before the spindle or stem is passed through the same, so that the head $g$ of the spindle or shank shall bear upon the outer edge of the rosette or disk $f$.

In order to prevent the turning of the stem-spindle $e'$ in the button or knob, I have provided it with ears or fins $h$, upset from the metal of the spindle. These ears or fins extend into the material of the knob or button, and of course prevent the spindle from being turned thereon.

To secure the knob E upon the fins $h$, the spindle is placed in a vice or clamp, the knob E driven thereon so that the fins enter the wood. The rosette is then placed upon the stem, and the end of the stem upset. Of course, instead of driving the knob E upon the fins, causing them to form their own grooves in the substance of the wood, grooves may be previously formed therein for their reception.

For the best effect it is desirable that the head of the spindle be dipped or plated, so that it shall have the same color as that of the rosette or disk which it fastens in place.

It will be observed that the ornamental metal finish to the end of the knob or button is in all respects similar to that provided by the old construction, but that, instead of milling the end of the stud or spindle, it is provided with a head, and instead of attaching the washer thereto and fastening a scalp or rosette thereon, the scalp or rosette is provided with a hole through which the shank of the spindle is passed and the head of the spindle brought in contact with the surface of the disk or rosette, and thereby locks it firmly against the outer end of the knob or button, while at the same time its spindle has a screw-thread, by means of which and a nut the knob or button is fastened securely in place.

I am aware of the Patent No. 210,065 to H. A. Tweed for stove-door knobs, and No. 234,696 to George W. Tucker for a drawer-pull, and I consider that the said patents do not show or describe a knob containing the essential elements of my invention.

Having thus fully described my invention, I claim and desire to secure by Letters Patent of the United States—

The combination of the knob E, the disk or rosette $f$, having the hole $f'$, the headed spindle $e'$, and the fastening-fins $h$, all substantially as and for the purposes described.

JAS. R. SUTLIFF.

In presence of—
 JOHN Q. THAYER,
 GEORGE S. JEFFREY.